United States Patent
Watson

[15] 3,688,597
[45] Sept. 5, 1972

[54] ROTARY RELEASER
[72] Inventor: Thomas A. W. K. Watson, 2720 Goyer St., Apt. 24, Montreal, Quebec, Canada
[22] Filed: Jan. 14, 1971
[21] Appl. No.: 106,405

[52] U.S. Cl............................................74/424.5
[51] Int. Cl..............................................F16h 1/18
[58] Field of Search..................74/424.5, 424.7, 425

[56] References Cited

UNITED STATES PATENTS

| | | | |
|---|---|---|---|
| 2,505,435 | 4/1950 | Schmidt | 74/425 X |
| 2,973,660 | 3/1961 | Popper | 74/424.5 |
| 3,343,426 | 9/1967 | Popper | 74/424.5 |
| 3,481,215 | 12/1969 | Howell | 74/424.5 |
| 3,508,452 | 4/1970 | Roantree | 74/424.7 |

*Primary Examiner*—Leonard H. Gerin

[57] ABSTRACT

A rotary releaser is a mechanical device with two mechanical connections, in which rotation of one connection is only possible when the other is rotated. Rotation of one connection acts to release a rotational moment on its other connection. In one version it comprises two screws with meshing helical threads rotatably mounted in a frame, which resists axial thrust and shafts connected to each of said screws. Rotation of either shaft or connection of the releaser is only possible if the other shaft is rotated in the same direction. The device is completely symetrical and any attempt to rotate one shaft only or both in opposite directions will result in axial thrust and no rotary motion.

8 Claims, 3 Drawing Figures

PATENTED SEP 5 1972 3,688,597

Thomas A. W. K. Watson

ROTARY RELEASER

When there is a rotational moment applied to the first shaft of the device, its second shaft may be used to control the rotation of the first shaft without transferring motion between its two shafts. In the case of the releaser comprising two screws any attempt to rotate one screw tends to turn the other screw in the opposite direction resulting in both screws exerting axial pressure against each other and their frame. The screws tend to turn in opposite directions to each other due to the frictional coupling between their threads, much in the same manners as two wheels mounted on parallel axes would tend to rotate when their outer peripherals are placed together. The threads on both screws are in the same direction and they will bind when any attempt is made to rotate them in opposite directions. When they are both rotated in the same direction they will not bind, but frictional forces would have to be overcome.

Another version of the releaser comprises a threaded nut and screw rotatably mounted to a frame which resists axial thrust, friction blocks connected to said frame bearing against said nut and screw and mechanical connections comprising shafts connected to said nut and screw. In this case the friction blocks resists rotation caused by the interaction of their helical threads, this then permits frictional forces to build up between the nut and screw and the frame. These forces prevent the rotation of one shaft unless the other shaft is rotated in the same direction.

If one shaft acts at all times as a control shaft, then only one friction block will be required, which would bear against the controlled shaft. The machinery to which the releaser is connected may have sufficient friction which will negate the need of the friction blocks.

A releaser may be composed of a worm gear meshed with two worms in which mechanical connections or shafts are connected to said worms which may be placed at any angle to each other. When small lead angles are employed the worm gear cannot drive the worm, only the worm can drive the worm gear. When two worms are meshed with a worm gear, neither worm can drive the worm gear since the undriven worm will prevent the worm gear's rotation. However, the device will permit the rotation of both worms simultaneously. The worm gear acts as a means of coupling the helical threads of the worms together.

It may be used as a control element between a first and second mechanical device where the degree of rotation of a driven first mechanical device is controlled by the rotation of a second mechanical device. In this application torque may be developed by the controlled first mechanical device without being transferred through the releaser to the second mechanical device, this torque manifests itself as an axial thrust. It can also be employed as a control element in manual and automatic transmissions, speed regulators, translating devices, etc.

The primary objective is to provide a device in which the rotation of a first connection will permit the rotation of a second connection. Another objective is to provide a means against which a controlled driven mechanical device may develop torque and to provide rotational control of said device. Another objective is to provide mechanical connections to the device at any angle to each other. These and other objectives will become apparent in the description which follows.

Figure 1:
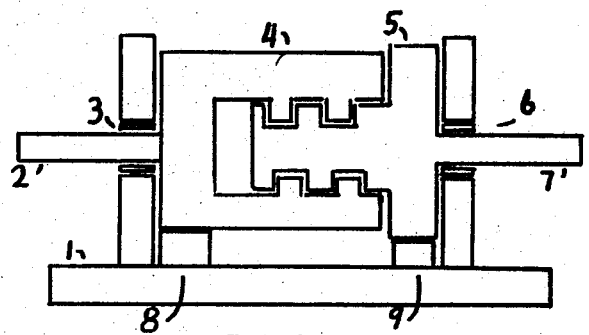
FIG. 1 is a cross-sectional side view of a rotary releaser comprising a nut and screw.

FIG. 1 shows a releaser with inline mechanical connections. Bearings 3 and 6 and friction blocks 8 and 9 are mounted to frame 1. A shaft 2 rotates in bearing 3 and is connected to nut or an internally threaded bushing 4. Nut 4 is threaded to screw 5 to which is connected shaft 7. Shaft 7 runs in bearing 6. Friction blocks 8 and 9 bear against nut 4 and screw 5 respectively.

Any attempt to rotate shaft 2 without an attempt to rotate shaft 7 in the same direction will only result in axial thrust occuring between the screw and nut and the frame. Shaft 2 may be rotated when shaft 7 is rotated in the same direction and at the same velocity. Whenever a rotational moment is applied to shaft 7, shaft 2 may be rotated in a direction which will release this rotational moment.

Figure 2:
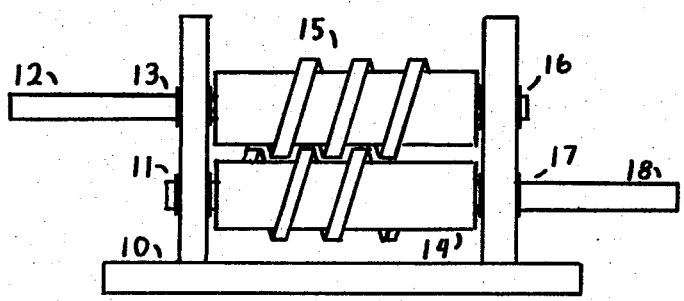
FIG. 2 is a side view of a rotary releaser comprising two screws.

FIG. 2 shows a releaser comprising two meshing screws. Bearings 11, 13, 16 and 17 are mounted to a frame 10. Screw 14 is connected to shaft 18 which rotates in bearings 11 and 17. Screw 15 is connected to shaft 12 which rotates in bearings 13 and 16. Screws 14 and 15 are meshed. An attempt to rotate shaft 12 results in screw 15 tending to rotate screw 14 in the opposite direction which results in axial thrust occuring between both screws and the frame, which prevents its rotation. Shafts 12 and 18 may be simultaneously rotated in the same direction at the same angular velocity. A rotational moment applied to shaft 18 may be released by rotation of shaft 12.

Figure 3:
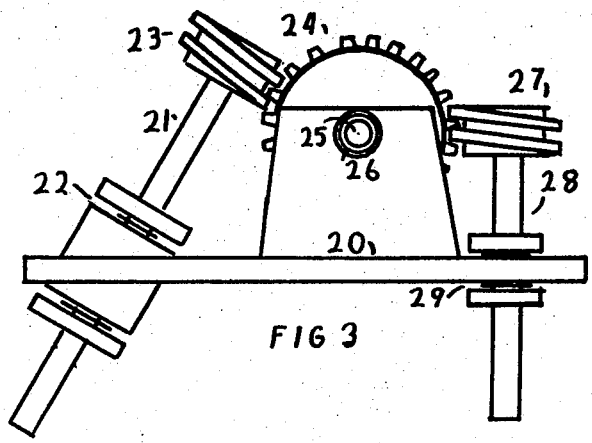
FIG. 3 is a side view of a releaser comprising two worms and a worm gear.

FIG. 3 shows an arrangement in which the shafts or mechanical connections to the releaser may be placed at any angle to each other. Bearings 22, 26 and 29 are mounted on frame 20. A worm 23 is mounted to shaft 21 which rotates in bearing 22. A worm 27 is mounted to shaft 28 which rotates in bearing 29. Worms 23 and 27 mesh with worm gear 24. The lead angle of the worms is kept to a small value such that when an angular moment is applied to the worm gear frictional forces existing between it and the worms are sufficiently high to prevent the rotation of the worms 23 and 27. Worm gear 24 is connected to shaft 25 which rotates in bearing 26. Rotation of shafts 21 is only possible when shaft 28 is rotated.

All three devices described are symetrical such that either shaft may be employed as the control shaft and the other shaft as the controlled shaft.

The invention is not to be construed as limited to the particular forms disclosed herein, since these are to be regarded as illustrative rather then restrictive.

I claim:

1. A rotary releaser comprising a frame means, a first and a second element each having a helical thread wound in the same direction and each having a torque transfer means integral therewith, each of the elements rotatably mounted to the frame means, means for preventing the axial displacement of said elements, the threads of the first element operatively connected to the threads of the second element, and means permitting the rotation of one element, only when the other element is rotated in the same direction.

2. A rotary releaser as claimed in claim 1 wherein the first and the second elements each comprise a worm, and said worms are operatively connected to each other by having the threads of each worm mesh with a worm gear rotatably mounted to the frame means.

3. A rotary releaser as claimed in claim 1 wherein the means permitting the rotation of one element, only when the other element is rotated in the same direction, comprises a frictional device connected between the frame means and the first element.

4. A rotary releaser as claimed in claim 1 wherein the means permitting the rotation of one element, only when the other element is rotated in the same direction, comprises a first frictional device connected between the frame means and the first element, and a second frictional device connected between the frame means and the second element.

5. A rotary releaser comprising a frame means, a first and a second element each having a helical thread wound in the same direction and each having a torque transfer means integral therewith, each of the elements rotatably mounted to the frame means, means for preventing the axial displacement of said elements, and the threads of the first element operatively connected to the threads of the second element, in which the lead angle of each thread is small enough to permit the rotation of one element, only when the other element is rotated in the same direction.

6. A rotary releaser as claimed in claim 5 wherein the first and the second elements each comprise a worm, and said worms are operatively connected to each other by having the threads of each worm mesh with a worm gear rotatably mounted to the frame means.

7. A rotary releaser comprising a nut and a screw each having a torque transfer means integral therewith, the nut threaded on the screw, the nut and the screw rotatably mounted to a frame means, means for preventing the axial displacement of said nut and screw, and means permitting the rotation of the nut, only when the screw is rotated in the same direction and vice versa.

8. A rotary releaser comprising, a first and a second screw each having threads wound in the same direction and each having a torque transfer means integral therewith, the first and the second screws rotatably mounted to a frame means with their threads meshed, means for preventing the axial displacement of said screws, and means permitting the rotation of one screw, only when the other screw is rotated in the same direction.

* * * * *